(12) United States Patent
Ito

(10) Patent No.: US 9,500,905 B2
(45) Date of Patent: Nov. 22, 2016

(54) LIQUID CRYSTAL DISPLAY DEVICE

(71) Applicant: EIZO Corporation, Ishikawa (JP)

(72) Inventor: Hiroshi Ito, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 8 days.

(21) Appl. No.: 14/497,331

(22) Filed: Sep. 26, 2014

(65) Prior Publication Data

US 2015/0009449 A1 Jan. 8, 2015

Related U.S. Application Data

(63) Continuation of application No. PCT/JP2012/071685, filed on Aug. 28, 2012.

(30) Foreign Application Priority Data

Mar. 30, 2012 (JP) .................. 2012-081266

(51) Int. Cl.
*G02F 1/1335* (2006.01)
*G02B 5/04* (2006.01)
*F21V 8/00* (2006.01)

(52) U.S. Cl.
CPC ............. *G02F 1/1336* (2013.01); *G02B 5/045* (2013.01); *G02B 6/0001* (2013.01); *G02B 6/0016* (2013.01); *G02B 6/0038* (2013.01); *G02B 6/0088* (2013.01); *G02F 1/133504* (2013.01); *G02F 1/133555* (2013.01); *G02F 1/133615* (2013.01); *G02F 2001/133616* (2013.01); *G02F 2001/133618* (2013.01)

(58) Field of Classification Search
CPC ........... G02F 1/1336; G02F 1/133615; G02F 1/133504; G02F 1/133555; G02B 5/045; G02B 6/0001; G02B 6/0016; G02B 6/0088
See application file for complete search history.

(56) References Cited

U.S. PATENT DOCUMENTS

| 5,608,837 A | 3/1997 | Tai et al. |
| 7,903,080 B2 * | 3/2011 | Yuuki .............. G02F 1/133615 345/1.1 |
| 8,432,353 B2 | 4/2013 | Nagata et al. |

(Continued)

FOREIGN PATENT DOCUMENTS

| JP | 2000-258766 A | 9/2000 |
| JP | 2000-356772 A | 12/2000 |

OTHER PUBLICATIONS

International Search Report for International Application No. PCT/JP2012/071685, issued by the Japanese Patent Office on Oct. 16, 2012.

(Continued)

*Primary Examiner* — Nathanael R Briggs

(57) ABSTRACT

A liquid crystal display device including: a liquid crystal panel 2; a diffuser 3 provided behind the liquid crystal panel 2; a light guide member 4 provided behind the diffuser 3; and a case supporting the liquid crystal panel 2, the diffuser 3, and the light guide member 4, where the case includes an opening at the back, the light guide member 4 is provided covering the opening, and the light guide member 4 includes a first prism 7 including an incident surface 8 on which outside light from above is incident, and a first slope surface 9 provided below the incident surface 8, and reflecting light incident from the incident surface 8 and on which outside light from behind is incident, the liquid crystal display device being able to make use of outside light efficiently.

14 Claims, 7 Drawing Sheets

(56) References Cited

U.S. PATENT DOCUMENTS

| | | | | |
|---|---|---|---|---|
| 2003/0160911 A1* | 8/2003 | Kano | ................... | G02B 6/0028 349/65 |
| 2004/0027513 A1* | 2/2004 | Yuuki | ............... | G02F 1/133536 349/96 |
| 2006/0187380 A1 | 8/2006 | Tsuda et al. | | |
| 2010/0141869 A1 | 6/2010 | Biernath et al. | | |
| 2010/0141870 A1* | 6/2010 | Choe | ...................... | G02B 5/045 349/65 |
| 2010/0177025 A1* | 7/2010 | Nagata | ................. | G02B 6/0028 345/76 |
| 2010/0208170 A1 | 8/2010 | Tanoue et al. | | |

OTHER PUBLICATIONS

Extended European Search Report for European Patent Application No. 12 872 367.3, issued by the European Patent Office on Aug. 5, 2015.

Notification of Office Action for Chinese Patent Application No. 201280071775.7, issued by the State Intellectual Property Office of the People's Republic of China on May 31, 2016.

Office Action issued for counterpart Russian Application 2014143534/28, issued by Russian Patent Office on Jul. 18, 2016.

Office Action issued for counterpart European Application 12872367.3, issued by the European Patent Office on Sep. 27, 2016.

* cited by examiner

LIQUID CRYSTAL DISPLAY DEVICE

BACKGROUND

1. Technical Field

The present invention relates to a liquid crystal display device and particularly relates to a technique of collecting outside light.

2. Related Art

A conventional liquid crystal display device guides light emitted from a backlight module using a light guide plate to backside of a liquid crystal panel, and diffuses the light evenly using a diffuser, thereby making the light incident on the liquid crystal panel as a surface light source. A CCFL tube or an LED is used as a backlight. Accordingly, a viewer can recognize a liquid crystal display with adequate brightness.

There is a type of liquid crystal display device that collects outside light as a part of the backlight, so as to reduce the power consumption of the backlight module. For example, the liquid crystal display device disclosed in Patent Document No. 1 guides outside light reflected at the reflector to inside of the liquid crystal display device via a semi-transmissive reflector. In this way, the device uses both of the collected outside light and the light from the backlight module.

Another type of liquid crystal display device is a transparent liquid crystal display device. The transparent liquid crystal display device is a liquid crystal display device that is not equipped with any backlight module. The transparent liquid crystal display device displays an image displayed on the liquid crystal panel, by overlapping it on a background, and so does not include either a light guide plate or a diffuser. An example of the transparent liquid crystal display device is a head-up display.

Patent Document 1: Japanese Patent Application Publication No. 2000-356772

However, the liquid crystal display device described in Patent Document No. 1 collects light from the reflector, and therefore only the light irradiated from above the liquid crystal display device can be guided. This prevents the outside light from being made use of to the full extent, and makes it impossible to obtain sufficient brightness. In addition, the transparent liquid crystal display device is a display device which displays a liquid crystal display image by overlapping it onto the background, and cannot display only the liquid crystal display image.

The present invention has been conceived of in view of such circumstances, and has an object of providing a liquid crystal display device which can efficiently use the outside light.

SUMMARY

So as to achieve the aforementioned object, the present invention has the following structure. In other words, the present invention is a liquid crystal display device including: a liquid crystal panel; a diffuser provided behind the liquid crystal panel; a light guide member provided behind the diffuser; and a case supporting the liquid crystal panel, the diffuser, and the light guide member, where the case includes an opening at the back, the light guide member is provided covering the opening, and the light guide member includes a first prism including a first incident surface on which outside light from above is incident, and a first slope surface which is provided below the first incident surface and which reflects the light incident from the first incident surface and on which outside light from behind is incident.

According to the above-described configuration, the diffuser is placed behind the liquid crystal panel, and the light guide member is provided further behind. The liquid crystal panel, the diffuser, and the light guide member are supported by the case. The opening is provided at the back of the case, from which outside light can be collected. Furthermore, by covering the opening with the light guide member, outside light can be guided towards the diffuser. The light guide member includes a first prism. The first prism includes a first incident surface onto which outside light from above is incident. The first prism further includes a first slope surface which is provided below the first incident surface and which reflects the light incident from the first incident surface and on which outside light from behind is incident. In this way, outside light from above can be collected by being incident on the first incident surface and thereafter being reflected on the first slope surface, whereas outside light from behind can be collected by being incident on the first slope surface. By enabling to collect outside light irradiated onto the liquid crystal display device from upper to backward directions, outside light can be made use of efficiently. In addition, the diffuser prevents the background from being seen through, and enables to display only a liquid crystal display image by the liquid crystal panel.

In addition, the opening preferably has a size equal to or greater than a display area of the liquid crystal panel. When the size of the opening is equal to or greater than a display area of the liquid crystal panel, light can be collected through the entire surface of the display area of the liquid crystal panel, which helps increase the amount of light. In addition, it helps decrease unevenness in amount of light across the display area of the liquid crystal panel.

In addition, it is preferable that the first prism is a triangular prism including the first incident surface, the first slope surface, and a first emitting surface from which light is emitted, a vertex angle formed by the first incident surface and the first slope surface is provided farther backward than the first emitting surface, and the first emitting surface is parallel to a display surface of the liquid crystal panel. In other words, in the first prism, a vertex angle formed by the first incident surface and the first emitting surface is positioned farther backward than the first emitting surface parallel to the display surface of the liquid crystal panel, and therefore the first incident surface and the first slope surface are positioned farther backward than the first emitting surface. Accordingly, outside light irradiated from upper to backward directions can be guided efficiently.

In addition, in the light guide member, a plurality of the first prism are preferably provided in a height direction. By providing the plurality of first prisms in a height direction in the light guide member, the thickness of the light guide member can be reduced, thereby preventing the liquid crystal display device from becoming large.

In addition, it is preferable that the light guide member includes a second prism provided farther forward than the first prism, the second prism includes a second incident surface overlapped on the first emitting surface when viewed from behind and a second slope surface which is provided farther forward than the second incident surface and which reflects or transmits light incident from the second incident surface.

The light guide member can further curve the progression of the light the first prism guides, by including a second prism before the first prism. The second prism includes a second incident surface overlapped with the first emitting surface of the first prism when viewed from behind, and therefore light emitted from the first emitting surface is incident from the second incident surface to inside of the second prism. In addition, the second prism includes a second slope surface which is provided farther forward than the second incident surface and which reflects or transmits light incident from the second incident surface. The light incident from the second incident surface is transmitted by the second slope surface either by being reflected upwardly or by refracted upwardly. The second prism can provide the light guided by the first prism with a directivity by curving the progression of light to the upper direction. Accordingly, light having an upper directivity is emitted from the liquid crystal panel towards a viewer viewing the liquid crystal display device from above. Due to this, the viewer can watch a bright view even with a small amount of light.

In addition, it is preferable that the second prism is a triangular prism including the second incident surface, the second slope surface, and a second emitting surface from which light is emitted, and the second incident surface is parallel to a display surface of the liquid crystal panel. Accordingly, the second prism can be manufactured easily.

In addition, in the light guide member, a plurality of the second prism are preferably provided in a height direction. By providing the plurality of second prisms in a height direction in the light guide member, the thickness of the light guide member can be reduced, thereby preventing the liquid crystal display device from becoming large.

In addition, an angle between the first incident surface and the first slope surface is preferably equal to or greater than a critical angle of the first prism and below 90 degrees. When the angle between the first incident surface and the first slope surface is equal to or greater than a critical angle of the first prism and below 90 degrees, the incident range of light which is incident from the first incident surface and is totally reflected at the first slope surface can be widened.

In addition, preferably, the first prism and the second prism are made of a same material. When the first prism and the second prism are made of a same material, the index of refraction is also the same, which further means that the total reflection condition is the same. When the first prism is in contact with the second prism, light will not be refracted at the surface of contact therebetween.

Furthermore, an angle between the first slope surface and the second slope surface is preferably (180 degrees−2× critical angle of the first prism). When the angle between the first slope surface and the second slope surface is (180 degrees−2×critical angle of the first prism), backward progression of the light which was totally reflected at the second slope surface is reduced, and reduction in amount of light irradiated onto the diffuser is prevented.

The first prism and the second prism may be integrally formed. A single prism results by integrally forming the first prism and the second prism. Therefore, diffuse reflection is prevented in the progression of light from the first prism to the second prism, which helps prevent reduction in amount of light.

In addition, the first emitting surface of the first prism and the second incident surface of the second prism may be placed with a sheet therebetween. By placing the first emitting surface of the first prism and the second incident surface of the second prism with a sheet therebetween, the first prism and the second prism can be formed separately from each other, which facilitates manufacturing.

A light source may be included between the light guide member and the diffuser in a lower position. By including a light source between the light guide member and the diffuser in a lower position, light can be made to be incident onto the diffuser directly from a lower position of the liquid crystal panel. There is also collected outside light, and so the amount of light to be irradiated onto the diffuser will increase.

The summary clause does not necessarily describe all necessary features of the embodiments of the present invention. The present invention may also be a sub-combination of the features described above.

The present invention provides a liquid crystal display device enabling to make use of outside light efficiently.

FORM TO CARRY OUT THE INVENTION

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

First Embodiment

Figure 1:
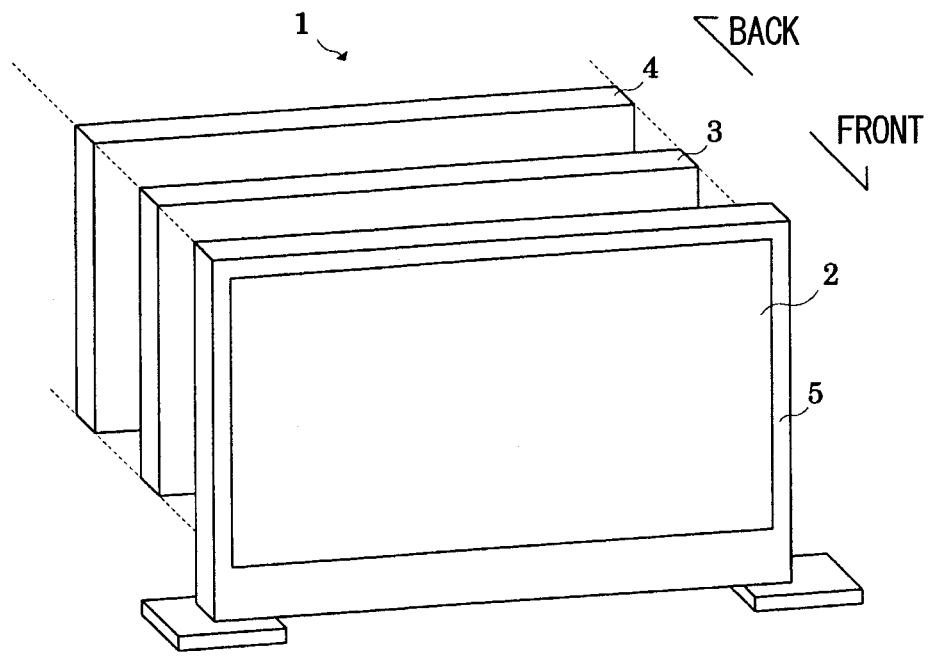
FIG. 1 An exploded perspective view of the schematic configuration of a liquid crystal display device according to the first embodiment.
Figure 2:
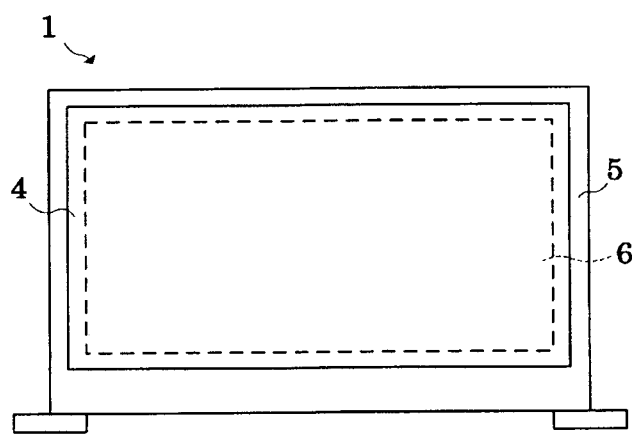
FIG. 2 A rear view of a liquid crystal display device according to the first embodiment.

Embodiments of the present invention are described as follows with reference to the drawings. FIG. 1 is an exploded perspective view of the schematic configuration of a liquid crystal display device, and FIG. 2 shows a rear view of the liquid crystal display device. Note that in the present specification, the outside light means light irradiated from outside of a liquid crystal display device onto the liquid crystal display device, and includes illumination light in the room, in addition to light derived from nature such as sunlight. The display surface side of the liquid crystal panel is referred to as forward, front side, before, or similar terms, and the opposite side of the liquid crystal panel is referred to as backward, backside, behind, or similar terms.

1. Schematic Configuration of Liquid Crystal Display Device

As shown in FIG. 1, the liquid crystal display device 1 includes a liquid crystal panel 2, a diffuser 3 diffusing light from behind the liquid crystal panel 2, a light guide member 4 guiding outside light from behind the diffuser 3, and a case 5 to support the liquid crystal panel 2, the diffuser 3, and the light guide member 4.

The liquid crystal panel 2 adopts an active matrix liquid crystal display panel using a thin film transistor (TFT). The liquid crystal panel 2 includes a plurality of pixels in a matrix formation, each of the plurality of pixels having three sub pixel cells having red (R), green (G), and blue (B) color filters.

The diffuser 3 is placed behind the liquid crystal panel 2. A light guide member 4 is placed behind the diffuser 3. The diffuser 3 diffuses light incident from the light guide member 4 placed at the backside, thereby generating even light in which irradiation unevenness is decreased. The even light is emitted towards the liquid crystal panel 2.

The case 5 stores therein the liquid crystal panel 2 and the diffuser 3, and includes, at the backside, an opening 6 which is equal to or larger than the effective display area of the liquid crystal panel 2. The opening 6 is covered by the light guide member 4. The light guide member 4 may be either supported inside the case 5 to cover the opening 6, or supported outside the case 5 to cover the opening 6. In FIG. 2, the light guide member 4 is supported outside of the case 5. Accordingly, the upper side, the lower side, and the lateral side of the light guide member 4 are open toward outside. When supporting the light guide member 4 inside of the case 5, the light irradiated onto the opening 6 of the case 5 is incident onto the light guide member 4.

2. Configuration of Light Guide Member 4

Figure 3:
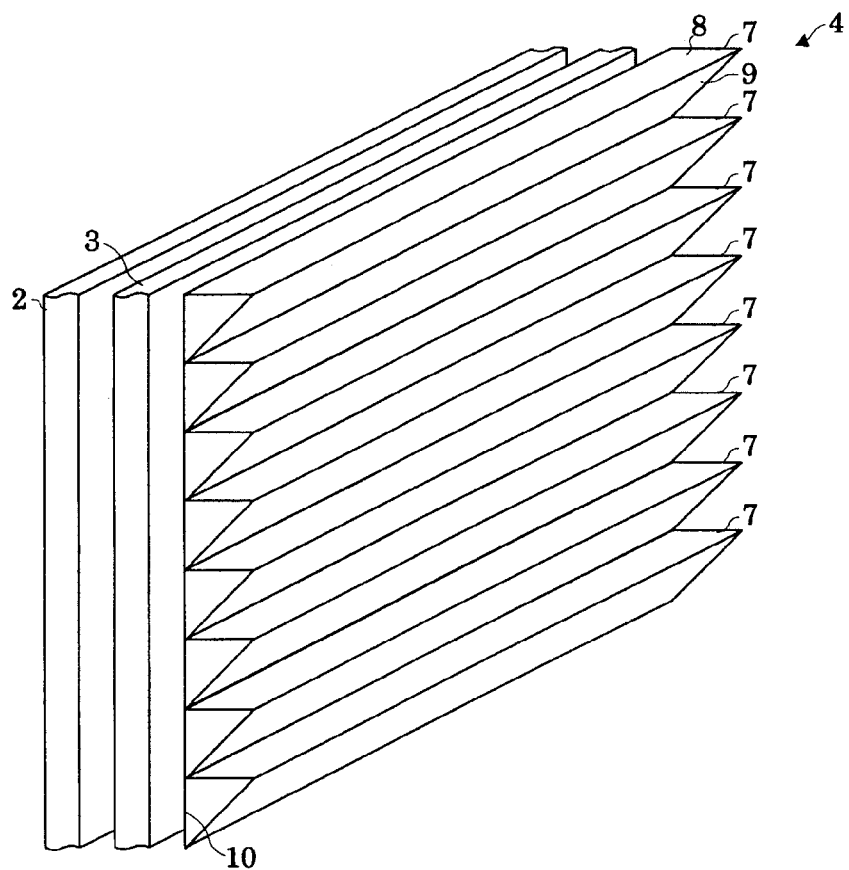
FIG. 3 A perspective view of the configuration of a light guide member according to the first embodiment.
Figure 4:
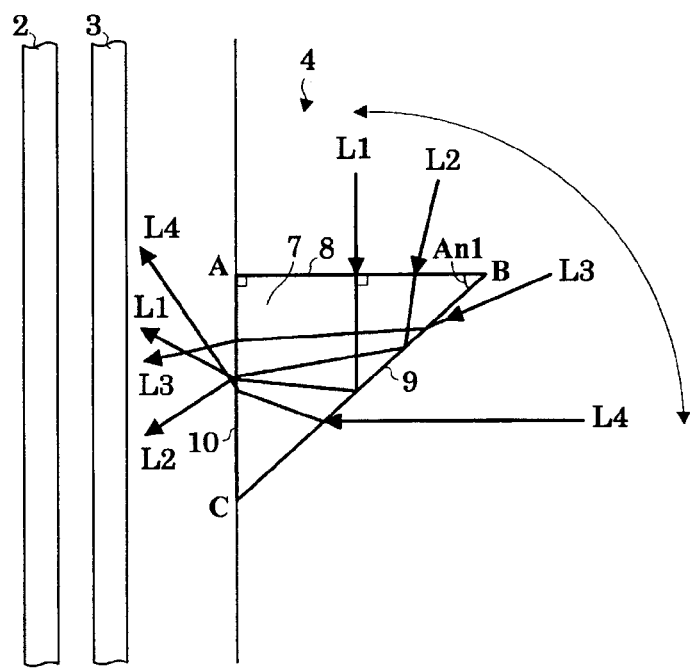
FIG. 4 A diagram explaining the light path incident on a light guide member according to the first embodiment.

The following explains the light guide member 4 with reference to FIG. 3 and FIG. 4. FIG. 3 is a perspective view of the configuration of a light guide member, and FIG. 4 is a diagram explaining the light path incident on a single prism of the light guide member. A plurality of prisms 7 having a right-triangular longitudinal section are provided for the light guide member 4 in a longitudinal direction. The prism 7 includes an incident surface 8 onto which light from above is incident, a slope surface 9 which reflects the light incident from the incident surface 8 and onto which light from behind is incident, and an emitting surface 10 from which light either incident on or reflected at the slope surface 9 is emitted from the prism 7. The prism 7 corresponds to the first prism according to the present invention, the incident surface 8 corresponds to the first incident surface according to the present invention, the slope surface 9 corresponds to the first slope surface according to the present invention, and the emitting surface 10 corresponds to the first emitting surface according to the present invention.

The incident surface 8 is vertical to the display surface of the liquid crystal panel 2, and the emitting surface 10 is parallel to the display surface of the liquid crystal panel 2. The angle A between the incident surface 8 and the emitting surface 10 is right angle. The light guide member 4 can be manufactured easier by adopting a right-angled prism as the prism 7. The slope surface 9 is provided below the incident surface 8. The vertex angle B of the prism 7, which is formed by the incident surface 8 and the slope surface 9, is formed farther backward than the emitting surface 10. Accordingly, light from above can be incident onto the incident surface 8, whereas light from behind can be incident onto the slope surface 9. In addition, the incident surface 8 and the slope surface 9 are exposed outside of the liquid crystal display device 1, thereby efficiently guiding outside light. The prism 7 may be manufactured either by acrylic resin such as a polymethylmethacrylate (PMMA) or other polymer materials, or by an inorganic material such as glass.

The light L1 and L2 irradiated from above the light guide member 4 are incident onto the incident surface 8 of the prism 7. The light L2 incident onto the incident surface 8 at an angle is refracted at the incident surface 8, and progresses inside the prism 7. The light L1 and the light L2 progressing inside the prism 7 are totally reflected at the slope surface 9, and emitted from the emitting surface 10. Because the inside of the prism 7 is a solid, and the outside of the prism 7 is air, the index of refraction of light differs at the slope surface 9. This causes the total reflection depending on the reflection angle. In this way, when the light irradiated from above the prism 7 is incident onto the incident surface 8, the progression thereof is curved towards the diffuser 3 depending on its incident angle.

In addition, the light L3 and the light L4 irradiated from behind the light guide member 4 are incident onto the slope surface 9 of the light guide member 4. The light L3 and the light 4 incident onto the slope surface 9 are refracted at the slope surface 9 and progress inside the prism 7, and emitted from the emitting surface 10. In this way, when the light irradiated from behind the prism 7 is incident onto the slope surface 9, its progression is curved towards the diffuser 3 depending on the incident angle.

As explained above, the light guide member 4 can guide light irradiated from upper to backward directions to emit the light towards the diffuser 3, by means of different actions depending on the surfaces of the prism 7. That is, the progression of the light incident onto the incident surface 8 is curved making use of total reflection, and the light incident onto the slope surface 9 is guided making use of transmission.

The angle An1 of the vertex angle B of the prism 7 formed between the incident surface 8 and the slope surface 9 is preferably equal to or greater than the critical angle of the prism 7 and below 90 degrees. If the angle An1 is equal to or greater than the critical angle and below 90 degrees, in the range of the incident angle of the light incident onto the incident surface 8, the range of the incident angle of the light totally reflected at the slope surface 9 becomes wide. The angle An1 is more preferably the critical angle. In this case, the incident surface 8 and the vertex angle B can be formed to protrude up to the backmost position, thereby enabling to increase the amount of light that can be collected from above.

Figure 5:
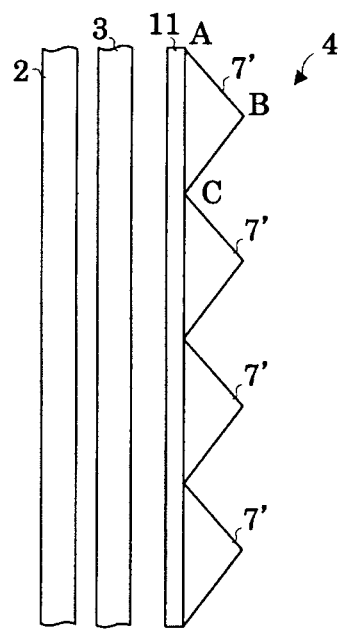
FIG. 5 A longitudinal sectional view showing the configuration of a light guide member according to the first embodiment.

Note that in the light guide member 4, a plurality of prisms 7 may be provided on the sheet 11 made of a synthetic resin such as PMMA, in the longitudinal direction. That is, when viewed from the lateral side, a plurality of prisms 7 are placed serially in the vertical direction at the back surface of the sheet 11. It is also possible to adopt the prisms 7 whose longitudinal section is triangular but not right triangular. In FIG. 5, a plurality of prisms 7' having a longitudinal section which is not right triangular are provided on the sheet 11 in the longitudinal direction. The sheet 11 and the prism 7 or 7' are preferably made of a same material. When the sheet 11 and the prism 7 or 7' are made of a same material, refraction of light at their interface can be prevented.

Figure 6:
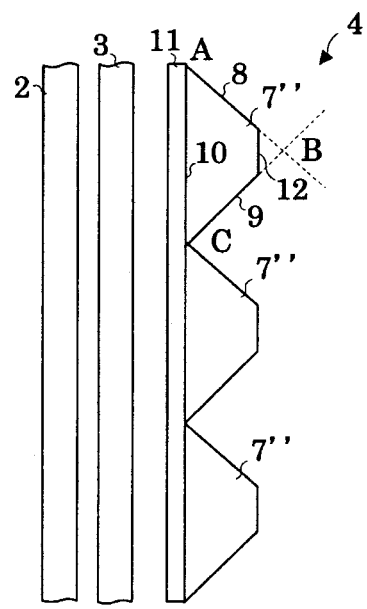
FIG. 6 A longitudinal sectional view showing the configuration of a light guide member according to the first embodiment.

It is also possible to adopt a prism 7" which has a trapezoidal section, as shown in FIG. 6. In this case, the longer the longitudinal length of the top surface 12 of the trapezoid, the more the amount of light totally reflected at the slope surface 9 will be reduced. Therefore, the length of the top surface 12 of the trapezoid may preferably be shorter. For this reason, for the prism adopted for the light guide member 4, a triangular form is preferred to a trapezoidal form.

According to the invention of the present application, the outside light irradiated from upper to backward directions of the liquid crystal display device 1 is guided to be incident onto the diffuser 3. Therefore, even when the liquid crystal display device 1 is not equipped with a light source, it can still perform favorable liquid crystal display. For example in an indoor situation, light of the illumination installed on the ceiling can be efficiently collected. Even in an outdoor situation, the sunlight can be efficiently collected.

When guiding light using a reflection mirror, the light irradiated from behind the reflection mirror surface is obstructed by the reflection mirror surface, to prevent the light from being guided. If a semi-transmissive reflector (half mirror) is used to guide light, the light desired to be reflected is also transmitted through the reflecting surface, which decreases the amount of light to be guided. In the first embodiment, the light guide member 4 uses the prism 7 to guide light, and so the light irradiated from behind the light guide member 4 can also be guided, to improve the brightness of the liquid crystal display device 1. The prism 7 can also increase the amount of light, by guiding light making use of actions different between the area to guide light using total reflection and the area to guide light using transmission depending on areas on which light is incident.

In addition, because the thickness of a sheet-like light guide member 4 is about 5 mm, and the thickness of a film-like light guide member 4 is several micrometers, the protrusion of the member 4 at the back of the liquid crystal display device 1 is greatly reduced compared to the reflection mirror type. In addition, when a lens is used to guide light, moire occurs due to aberration. However, the light guide member 4 uses the prisms 7, 7', 7" to guide light, which helps reduce the occurrence of moire. In addition, the effect of the diffuser 3 which makes light even can also greatly prevent the occurrence of moire.

Second Embodiment

Figure 7:
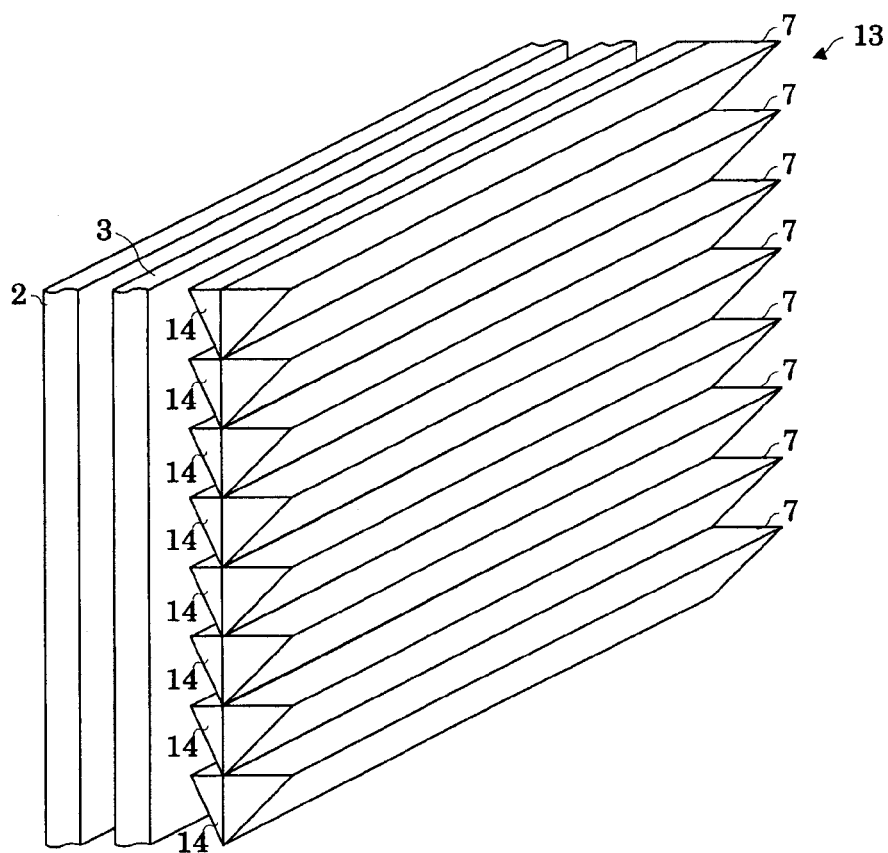
FIG. 7 A perspective view of the configuration of a light guide member according to the second embodiment.
Figure 8:
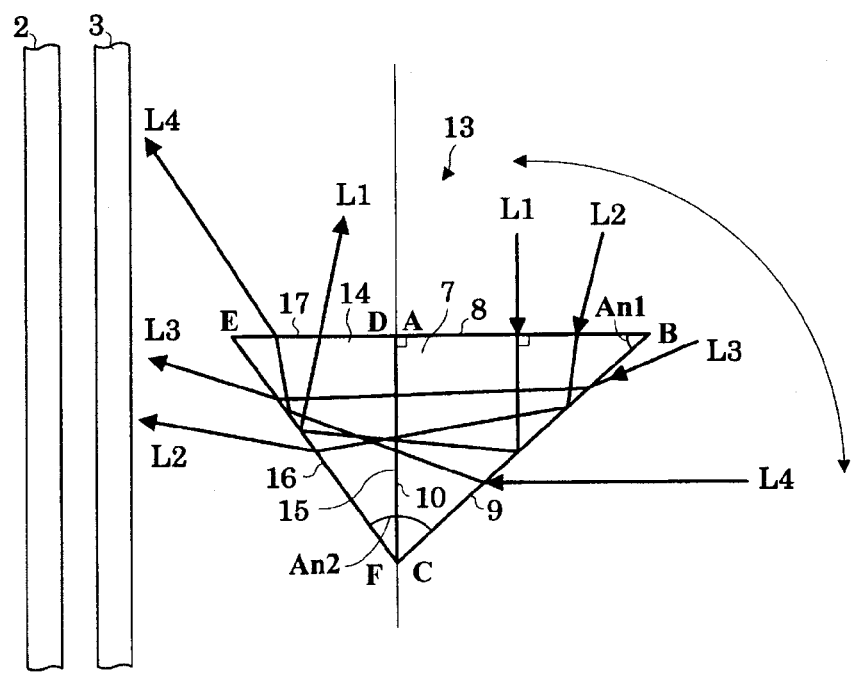
FIG. 8 A diagram explaining a light path incident on a light guide member according to the second embodiment.

Next, a liquid crystal display device according to the second embodiment is explained with reference to FIG. 7 and FIG. 8. FIG. 7 is a perspective view showing the configuration of the light guide member according to the second embodiment, while FIG. 8 is a diagram explaining the light path incident on one prism of the light guide member according to the second embodiment. In FIG. 7 and FIG. 8, the reference numerals that are the same as those shown in the first embodiment indicate configurations similar to those of the first embodiment, and so their explanation is omitted in the following explanation. In addition, the configuration of the liquid crystal display device, except for those explained below, is similar to that of the first embodiment.

In the first embodiment, the prism 7 having a vertex angle farther backward than the emitting surface 10 is adopted as the light guide member 4. In the second embodiment, a prism 14, which additionally includes a vertex angle facing the diffuser 3 in the light guide member 4 of the first embodiment, is adopted as the light guide member 13. That is, in the light guide member 13, the prism 14 is formed before the prism 7.

A characteristic of the second embodiment is its capability of emitting light emitted from the emitting surface 10 of the prism 7 from the light guide member 13, in the direction upper than the horizontal direction, due to the adoption of the prism 14 having a vertex angle facing the diffuser 3 as the light guide member 13. The prism 14 includes an incident surface 15 overlapping the emitting surface 10 of the prism 7 when viewed from behind, a slope surface 16 emitting light incident from the incident surface 15 by either total reflection or refraction, and an emitting surface 17 emitting light after totally reflected at the slope surface 16. The prism 14 corresponds to the second prism of the present invention, the incident surface 15 corresponds to the second incident surface of the present invention, the slope surface 16 corresponds to the second slope surface of the present invention, and the emitting surface 17 corresponds to the second emitting surface of the present invention.

The incident surface 15 of the prism 14 is parallel to the display surface of the liquid crystal panel 2, and the emitting surface 17 is vertical to the display surface of the liquid crystal panel 2. The angle D between the incident surface 15 and the emitting surface 17 is right angular. The slope surface 16 is placed farther forward than the slope surface 9 and the incident surface 15. The vertex angle E of the prism 14 formed between the slope surface 16 and the emitting surface 17 is formed farther forward than the incident surface 15. The incident surface 15 of the prism 14 is provided to overlap the emitting surface 10 of the prism 7 when viewed from behind, and so light emitted from the emitting surface 10 of the prism 7 is incident on the incident surface 15.

The light incident from the incident surface 15 of the prism 14 is either reflected at the slope surface 16 and emitted from the emitting surface 17, or transmitted while being refracted by the slope surface 16 and emitted towards the diffuser 3. The light L1 irradiated from the vertically upper direction of the light guide member 13 is totally reflected at the slope surface 9 of the prism 7, and thereafter progresses within the prism 7 and the prism 14, and further totally reflected at the slope surface 16 of the prism 14, and emitted towards the back from the emitting surface 17. Consequently, in the second embodiment, the light L1 irradiated from the vertically upper direction cannot be guided towards the diffuser 3.

However, the light L2 irradiated from the backward obliquely upward direction of the light guide member 13 is totally reflected at the slope surface 9 of the prism 7, and thereafter progresses within the prism 7 and the prism 14, and is transmitted by being refracted through the slope surface 16 of the prism 14, thereby being incident in the oblique upward direction onto the diffuser 3. In addition, the light L3 irradiated from the backward direction the light guide member 13 is incident onto the slope surface 9 of the prism 7 by being refracted, and thereafter progresses inside the prism 7 and the prism 14, and is transmitted by being refracted through the slope surface 16 of the prism 14, thereby being incident in the oblique upward direction onto the diffuser 3.

Furthermore, the light L4 irradiated from the horizontally backward direction of the light guide member 13 is incident onto the slope surface 9 of the prism 7 by being refracted, and thereafter progresses inside the prism 7 and the prism 14, is totally reflected at the slope surface 16 of the prism 14 and is transmitted by being refracted through the emitting surface 17, thereby being incident in the oblique upward direction onto the diffuser 3. In this way, the light guide member 13 of the second embodiment can emit light incident from the upper to backward directions as light progressing in the direction upper than the horizontal direction, except for the light from the vertically upper direction. This is because the light incident on the prism 7 in the upper to backward directions is guided towards the prism 14, and the prism 14 guides the light incident from the prism 7 to the direction upper than the horizontal direction.

The prism 7 and the prism 14 are preferably made of a same material. In this case, refraction of light at the interface between the emitting surface 10 of the prism 7 and the incident surface 15 of the prism 14 can be prevented. In addition if the prism 7 and the prism 14 are made of a same material, the angle An2 which combines the angle C between the slope surface 9 and the emitting surface 10 of the prism 7 and the angle F between the incident surface 15 and the slope surface 16 of the prism 14 is preferably as follows: 180 degrees−2×critical angle of the prism 7 or prism 14. When the angle An2 satisfies this condition, the occurrence of backward progression of the light totally reflected at the slope surface 16 of the prism 14 is reduced, thereby preventing reduction in the amount of light irradiated towards the diffuser 3.

In addition, just as in the first embodiment, the angle An1 of the vertex angle B of the prism 7 formed between the incident surface 8 and the slope surface 9 is preferably equal to or greater than the critical angle of the prism 7 and below 90 degrees. If the angle An1 is equal to or greater than the critical angle and below 90 degrees, the range of the incident angle of the light totally reflected at the slope surface 9 in the range of the incident angle of the light incident onto the incident surface 8 becomes wide. The angle An1 is more preferably the critical angle. In this case, the incident surface 8 and the vertex angle B can be formed to protrude up to the backmost position, thereby enabling to increase the amount of light that can be collected from above.

According to the liquid crystal display device 1 according to the second embodiment, the light from the light guide member 13 is emitted in a direction upper than the horizontal direction, and therefore light having an upper directivity is incident onto the diffuser 3. Even after being diffused by the diffuser 3, the light progressing in a direction upper than the horizontal direction from the liquid crystal panel is larger in amount, and so even with a small amount of light, the screen looks brighter to a viewer viewing the liquid crystal display device 1 from above. For example, it is assumed that a user of a notebook computer views the liquid crystal panel from above in many cases. Therefore, the light suited for such a user viewing from above can be emitted from the liquid crystal panel 2.

Figure 9:
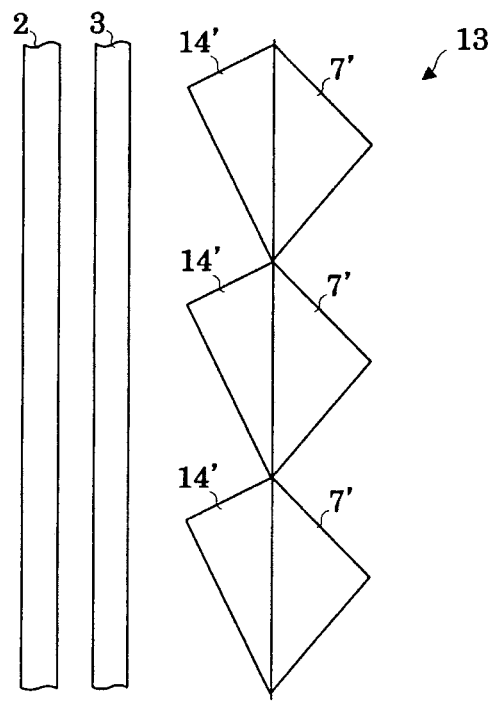
FIG. 9 A longitudinal sectional view showing the configuration of a light guide member according to the second embodiment.

A single triangular prism can be formed by integrating the prism 7 and the prism 14. By doing so, diffuse reflection of light is prevented at the interface between the prism 7 and the prism 14, thereby preventing the amount of light from decreasing. In addition, as shown in FIG. 9, a prism 7' and a prism 14', having a longitudinal sectional form triangular but not right angular may be adopted as a light guide member 13.

Figure 10:
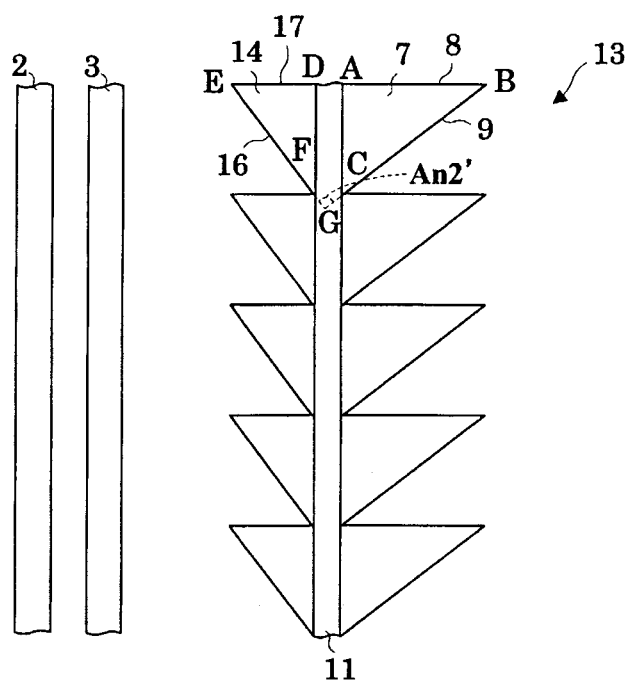
FIG. 10 A longitudinal sectional view showing the configuration of the light guide member according to the second embodiment.

In addition, as shown in FIG. 10, in the light guide member 13, a plurality of prisms 7 and prisms 14 may be arranged in a longitudinal direction on a sheet 11 made of a synthetic resin such as PMMA. That is, if viewed from the lateral side, a plurality of prisms 14 are placed serially in the vertical direction on the front surface of the sheet 11. In this case, the angle degree An2' of the angle G formed by extending the slope surface 9 of the prism 7 and the slope surface 16 of the prism 14 is preferably as follows: 180 degrees−2×critical angle of the prism 7 or prism 14. When the angle An2' satisfies this condition, the occurrence of backward progression of the light totally reflected at the slope surface 16 of the prism 14 is reduced, thereby preventing reduction in the amount of light irradiated towards the diffuser 3.

Figure 11:
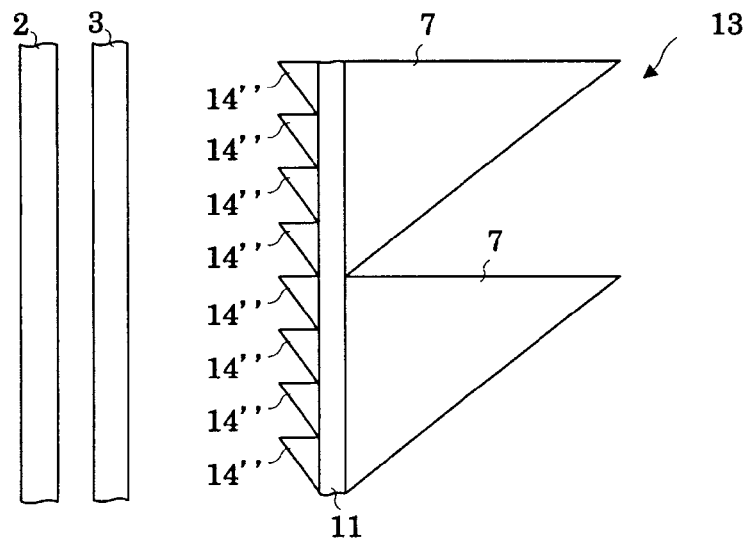
FIG. 11 A longitudinal sectional view showing the configuration of a light guide member according to the second embodiment.

Furthermore, it is also possible to arrange a plurality of prisms 7 and prisms 14" longitudinally at different array pitches, as shown in FIG. 11. By making the array pitch of the prism 14" shorter than the array pitch of the prism 7, the thickness of the prism 14" can be smaller.

Third Embodiment

Figure 12:
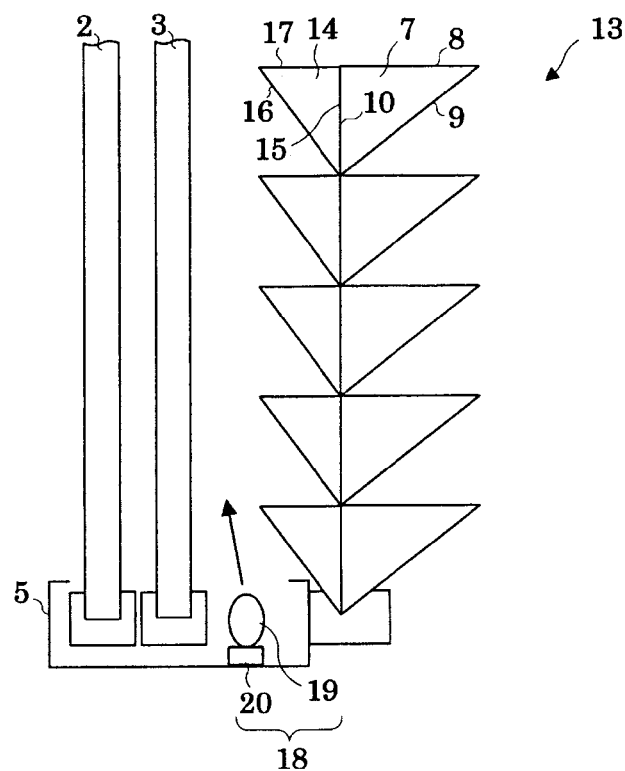
FIG. 12 A longitudinal sectional view showing the configuration of a liquid crystal display device according to the third embodiment.

Next, a liquid crystal display device according to the third embodiment is described with reference to FIG. 12. In FIG. 12, the reference numerals that are the same as those shown in the second embodiment indicate configurations similar to those of the second embodiment, and so their explanation is omitted in the following explanation. In addition, the configuration of the liquid crystal display device, except for those explained below, is similar to that of the second embodiment.

In the first embodiment and the second embodiment, the liquid crystal display device 1 is not equipped with an internal light source, and the backlight is solely derived from the outside light. However, the liquid crystal display device 1 according to the third embodiment has such a configuration as including an internal light source and irradiating the liquid crystal panel 2 with both of outside light and light from the internal light source. The characteristic of the third embodiment is that it includes a backlight module 18 at a lower backward portion of the diffuser 3 of the liquid crystal display device 1 of the second embodiment.

The backlight module 18 is placed at a lower position in the case 5 between the light guide plate 13 and the diffuser 3. The backlight module 18 includes a light source 19 and a light amount adjuster 20. The light source 19 adopts a single CCFL tube or LEDs arranged in a single array, and is positioned along the lateral direction of the display surface to be parallel to the display surface of the liquid crystal display panel 2. The light amount adjuster 20 includes a light sensor, and controls the amount of light irradiated from the light source 19 according to the amount of light between the diffuser 3 and the light guide plate 13.

The light guide plate 13 is a configuration suited for collecting outside light from upper to backward directions, and is not suited for guiding light from the forward direction. In other words, the light guide plate 13 does not include a reflection film, and therefore the light incident onto the light guide plate 13 from the light source 19 is guided to behind the light guide plate 13. However, the light from the light source 19 positioned in a lower position of the liquid crystal panel 2 along the lateral direction of the display surface to be in parallel to the display surface of the liquid crystal display panel 2 can be directly incident onto the diffuser 3 without passing through the light guide plate 13. Accordingly, this will increase the amount of light irradiated to the diffuser 3, together with the amount of collected outside light.

Figure 13:
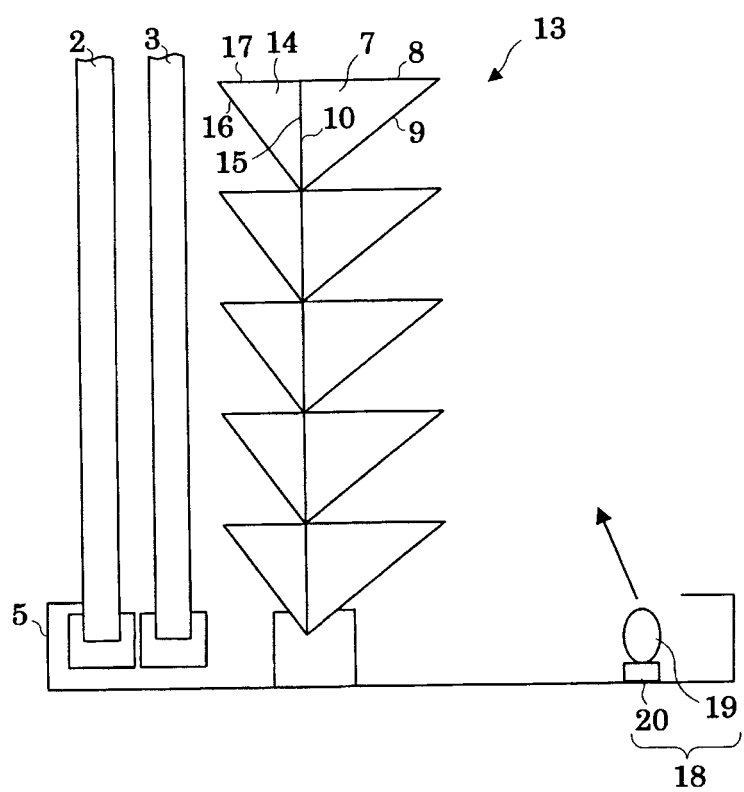
FIG. 13 A longitudinal sectional view showing the configuration of a liquid crystal display device according to the third embodiment.

In addition, the backlight module 18 can be placed in a lower backward portion of the light guide plate 13, as shown in FIG. 13. The light guide plate 13 emits light, which was incident from below, in the horizontally lower direction to the diffuser 3. That is, when the light from below is incident onto the slope surface 9 of the prism 7, the light progresses within the prism 7, to be totally reflected at the incident surface 8 of the prism 7 or at the emitting surface 17 of the prism 14. The totally reflected light is emitted from the slope surface 16 in the horizontally lower direction. According to this configuration, the diffuser 3 is irradiated with the lower light from the entire light guide plate 13, thereby enabling to improve evenness of the light irradiated from the internal light source. Note that the backlight module 18 in this case may have a configuration capable of being mounted to the liquid crystal display device 1 as a part to be assembled in later stages.

The liquid crystal display device 1 according to the third embodiment includes the backlight module 18 in the lower backward portion of the diffuser 3. Therefore, the amount of light from the light source 19 can be added to the amount of light from the collected outside light, depending on situations of brightness of outside light. Accordingly, liquid crystal display can be performed even under dark environments. Note that a similar effect can be obtained by including the backlight module 18 in a lower position inside the case 5 between the light guide plate 13 and the diffuser 3 of the liquid crystal display device 1 according to the first embodiment.

The present invention is not limited to the above-described embodiments, and can be modified as in the following.

(1) In the above-described embodiments, all the emitting surface 10 of the prisms 7 and the incident surfaces 15 of the prisms 14 constituting the light guide member 4 or 13 are parallel to the display screen of the liquid crystal panel 2. However, the emitting surfaces 10 and the incident surfaces 15 of the prisms 7, 14 provided in the upper portion of the light guide member 4 or 13 may be provided nearer the diffuser 3 than the emitting surfaces 10 and the incident surfaces 15 of the prisms 7, 14 provided in the lower position of the light guide member 4 or 13. Such an arrangement may be realized by causing level differences within the light guide member 4 or 13, or tilting the upper portion of the light guide member 4 or 13 towards the diffuser 3. Accordingly, since the area for receiving light from above the light guide member 4 or 13 increases, the amount of collected light can be increased, thereby enabling to display the liquid crystal panel 2 brighter.

(2) In the above-described embodiments, the liquid crystal panel 2 includes a color filter. However, the present invention is not limited to this configuration. For example, the present invention includes a monochrome liquid crystal panel without a color filter. A monochrome liquid crystal panel is not subject to light attenuation attributed to a color filter. Therefore, a brighter liquid crystal display device can be obtained.

(3) In the above-described embodiments, it is also possible to attach a non-reflecting film on a surface of the liquid crystal panel 2, to reduce reflection of light on the surface of the liquid crystal panel 2. By doing so, the brightness from the liquid crystal display panel 2 can be enhanced even when the amount of outside light guided by the light guide member 4 or 13 is small.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A liquid crystal display device comprising:
   a liquid crystal panel;
   a diffuser provided behind the liquid crystal panel;
   a light guide member provided behind the diffuser; and
   a case supporting the liquid crystal panel, the diffuser, and the light guide member, wherein
   the case includes an opening at the back,
   the light guide member is provided covering the opening, and
   the light guide member includes a first prism including a first incident surface and a first slope surface which is provided below the first incident surface and which reflects light incident from the first incident surface, the first incident surface and the first slope surface exposed outside of the liquid crystal display device such that outside light arriving at the liquid crystal display device from above the liquid crystal display device at an angle orthogonal to the normal of the liquid crystal panel is incident on the first incident surface and outside light from behind the liquid crystal device is incident on the first slope surface.

2. The liquid crystal display device according to claim 1, wherein
   the opening has a size equal to or greater than a display area of the liquid crystal panel.

3. The liquid crystal display device according to claim 1, wherein
   the first prism is a triangular prism including the first incident surface, the first slope surface, and a first emitting surface from which light is emitted,
   a vertex angle formed by the first incident surface and the first slope surface is provided farther backward than the first emitting surface, and
   the first emitting surface is parallel to a display surface of the liquid crystal panel.

4. The liquid crystal display device according to claim 1, wherein
   in the light guide member, a plurality of the first prisms are provided in a height direction.

5. The liquid crystal display device according to claim 3, wherein
   the light guide member includes a second prism provided farther forward than the first prism, and
   the second prism includes a second incident surface overlapped on the first emitting surface when viewed from behind, and a second slope surface which is provided farther forward than the second incident surface and which reflects or transmits light incident from the second incident surface.

6. The liquid crystal display device according to claim 5, wherein the second prism is a triangular prism including the second incident surface, the second slope surface, and a second emitting surface from which light is emitted, and the second incident surface is parallel to a display surface of the liquid crystal panel.

7. The liquid crystal display device according to claim 5, wherein in the light guide member, a plurality of the second prisms are provided in a height direction.

8. The liquid crystal display device according to claim 1, wherein an angle between the first incident surface and the first slope surface is equal to or greater than a critical angle of the first prism and below 90 degrees.

9. The liquid crystal display device according to claim 5, wherein the first prism and the second prism are made of a same material.

10. The liquid crystal display device according to claim 9, wherein an angle between the first slope surface and the second slope surface is (180 degrees−2×critical angle of the first prism).

11. The liquid crystal display device according to claim 5, wherein the first prism and the second prism are integrally formed.

12. The liquid crystal display device according to claim 5, wherein the first emitting surface of the first prism and the second incident surface of the second prism are placed with a sheet therebetween.

13. The liquid crystal display device according to claim 1, comprising a light source below a region between the light guide member and the diffuser.

14. The liquid crystal display device according to claim 1, wherein the first incident surface and the first slope surface are open to outside the liquid crystal device.

* * * * *